United States Patent
Robinson

[15] 3,690,156
[45] Sept. 12, 1972

[54] NOISE GATE FOR ULTRASONIC TEST APPARATUS

[72] Inventor: John A. Robinson, Sam Ramon, Calif.

[73] Assignee: Automation Industries, Inc., Century City, Calif.

[22] Filed: May 27, 1971

[21] Appl. No.: 147,662

Related U.S. Application Data

[63] Continuation of Ser. No. 822,645, May 7, 1969, abandoned.

[52] U.S. Cl. .................................................73/67.9
[51] Int. Cl. .............................................G01n 29/04
[58] Field of Search............23/67.5, 67.7, 67.8, 67.9

[56] References Cited

UNITED STATES PATENTS

| | | | |
|---|---|---|---|
| 3,427,868 | 2/1969 | Charbonnier et al. | 73/67.9 |
| 3,350,924 | 11/1967 | King | 73/67.9 |
| 3,404,560 | 10/1968 | Kaule | 73/67.9 X |

Primary Examiner—Richard C. Queisser
Assistant Examiner—Arthur E. Korkosz
Attorney—Dan R. Sadler

[57] ABSTRACT

An ultrasonic nondestructive test system is described which includes a noise gate which is capable of immediately removing noise signals from the input signals before they reach the receiver. The system includes a search unit, a transmitter and receiver unit for displaying on a display device the defects or other discontinuities on the workpiece. The noise gate includes a delay line and a coincident circuit. The return signal from the search unit is delayed a predetermined time and compared with the input signal in the coincident circuit to pass only coincident signals after a predetermined time has passed. This is because noise is characteristically a pulse of a short time duration and much less than the return pulse input from the search unit.

4 Claims, 4 Drawing Figures

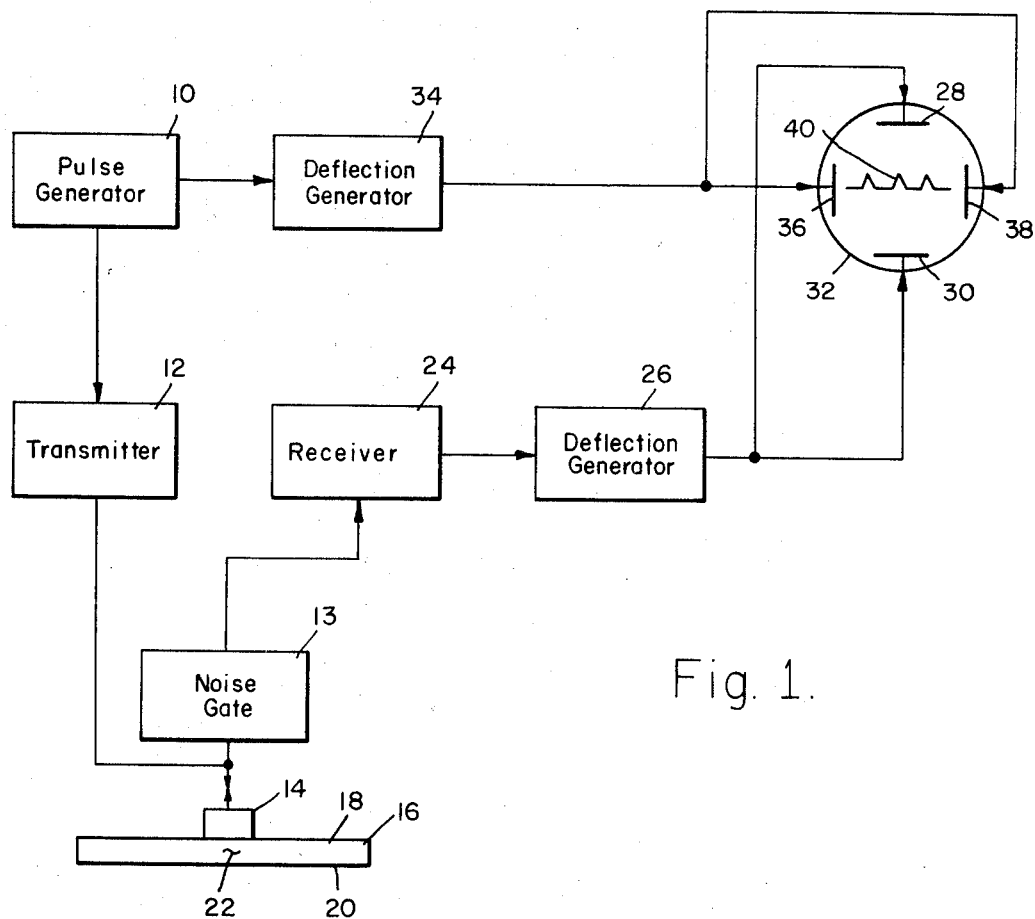
Fig. 1.
John A. Robinson,
INVENTOR.
BY.
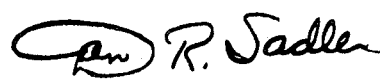
ATTORNEY.

John A. Robinson,
INVENTOR.
BY.
ATTORNEY.

NOISE GATE FOR ULTRASONIC TEST APPARATUS

CROSS-REFERENCE TO RELATES APPLICATION

This is a continuation of co-pending application, Ser. No. 822,645, filed May 7, 1969, now abandoned, for Material Tester on behalf of John A. Robinson and assigned of record to Automation Industries, Inc.

BACKGROUND OF THE INVENTION

A. Field of the Invention

This invention relates to nondestructive test systems, and more particularly to a nondestructive test system with a noise gate circuit which gates out noise signals and passes video return signals.

B. Discussion of the Prior Art

In the art of nondestructive material testing there is provided an instrument for inspection by means of ultrasonics. In testing materials in accordance with the techniques described herein, a short high frequency electrical pulse is applied to a search unit usually comprising a piezoelectric transducer or the like. The frequency of the pulse is in the ultrasonic range. The transducer vibrates at the ultrasonic frequency and is coupled to a workpiece to be tested through an intervening couplant, for example. The ultrasonic vibrations travel through the workpiece under test and are reflected from the surfaces thereof, as well as from any flaw, defect or other discontinuity which may be in the workpiece. Upon striking the transducer, an electrical echo signal is generated. Both the transmitted pulse and various echoes are amplified and applied to the vertical deflection gates of a cathode ray tube, for example. The horizontal sweep of the cathode ray tube is set so as to provide a visual indication of the depth of the defect.

It is well known in the art that return signals from nondestructive test systems, such as ultrasonic nondestructive material testers and the like, are subject to radiated interference noises from outside sources such as welders, D.C. motors and the like. If these noise signals are not eliminated from displayed signals, they can easily be confused with defect signals which are returned from the material being tested.

The aforesaid noise signals will sometimes appear in the displayed signal and it is very difficult to distinguish the noise from the original front and back surface reflections, and particularly difficult to distinguish from defects. This is especially true if these defects are of a minute size.

SUMMARY

Briefly described, the present invention includes a noise gate, preferably positioned between the search unit of the ultrasonic test and the test equipment used therewith. The noise gate includes an input terminal coupled to receive the signals from the search unit and an output signal adapted to be coupled to the test instrument for applying noise-free signals thereto. The noise gate includes an input terminal and an output terminal and a delay means having an input terminal coupled to the input terminal and an output means coupled to a coincident gate. The input signal is also directly applied to the coincident gate and to the delay line from the input terminal from the search unit.

In operation, a noise signal is characteristically a fast pulse of a short time duration, and in most cases less than the echo return pulse from the search unit. A return signal is applied both to the delay line and to the coincident gate. Thus, the first part of the pulse is lost by the amount of time in the delay line. The coincident gate conducts until the undelayed video runs out of time and stops conducting. By this method, all that is lost in the signal is some of the width of the video signal. When a delay line is chosen such that delay time is longer than noise and less than the return signal, then the noise signals are cut off by lack of coincidence.

By this invention, the random noise pulses are eliminated electronically regardless of the number of pulses involved, and without the use of pulse counting logic as provided in the prior art systems. The advantages over the prior art are that each noise pulse is independently eliminated regardless of the frequency of the pulses. These noise pulses thereafter are no longer existent in the instrument, as the signals are processed and conditioned for flaw alarm use. By this invention, two major advantages are realized: first, that any number of pulses can be eliminated, and secondly, inspection speed need not be reduced due to time needed for counting a fixed number of pulses. Gate width can be increased, since the number of noise pulses does not affect the effectiveness. Therefore, maximum scan speeds in any gate setting may be used.

DESCRIPTION OF THE DRAWINGS

These and other features and advantages will be apparent to those skilled in the art when taken into consideration with the following detailed description, wherein like reference numerals indicate like and corresponding parts throughout the several views and wherein:

FIG. 1 is a block diagram of an ultrasonic test system using the principles of this invention;

DESCRIPTION OF THE PREFERRED EMBODIMENTS

Figure 2:
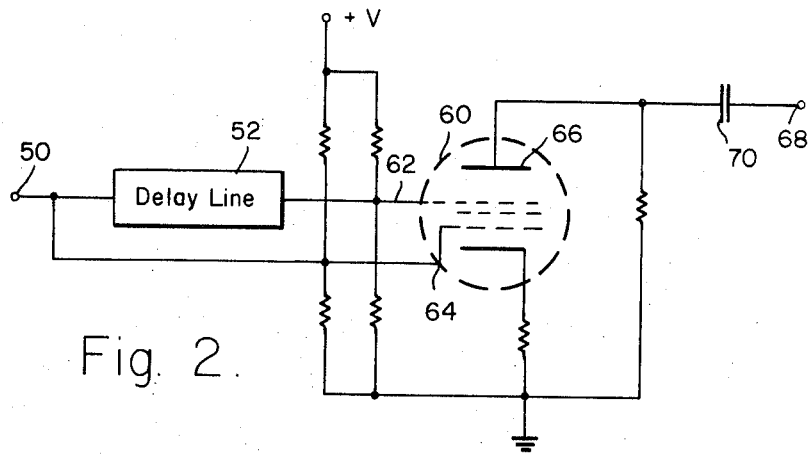
FIG. 2 is an electrical schematic diagram of one preferred embodiment of the noise gate shown in FIG. 1.

Turning now to a more detailed description of this invention, there is shown in FIG. 1 an ultrasonic test instrument of the type referred to herein. A pulse generator 10 produces signals to a transmitter 12. The pulse generator normally provides the rate of signals applied to the transmitter and also which are applied through the noise gate 13 to a search unit 14. The search unit may be the type which includes a piezoelectric transducer which vibrates in a thickness mode when electrical signals from the transmitter 12 are applied thereto. Search unit 14 converts the electrical signals into acoustical impulses which pass into a workpiece 16 through a suitable couplant. The acoustic impulses propagate through the workpiece 16 until they strike a reflecting boundary such as the surfaces 18 or 20 of the workpiece 16 or a defect 22 which may be contained in the workpiece 16. These signals are thereupon reflected back to the search unit 14 which generates an electrical voltage corresponding thereto. Both the initial electrical impulses and the reflected pulses are received into the noise gate 13 whereby random noises from radiated interferences or the like are removed therefrom and applied to a receiver 24. The signals from receiver 24 are then applied to a deflection generator 26 which applies them to the vertical deflection plates 28 and 30 of a cathode ray tube 32, for example.

The horizontal time base for the cathode ray tube 32 is provided by a horizontal sweep generator 34, which is also initiated by the pulse generator 10 upon generations of the initial impulses. The sweep signal is applied to the horizontal deflection plates 36 and 38 on the cathode ray tube 32. The cathode ray tube shows vertical deflections on a horizontal base on the display 40. These deflections may be indicative of the front and back reflections from the front and back surfaces 18 and 20 of the workpiece 16 or they may have therein indications which are indicative of the defect 22 shown in the workpiece 16.

Figure 3:
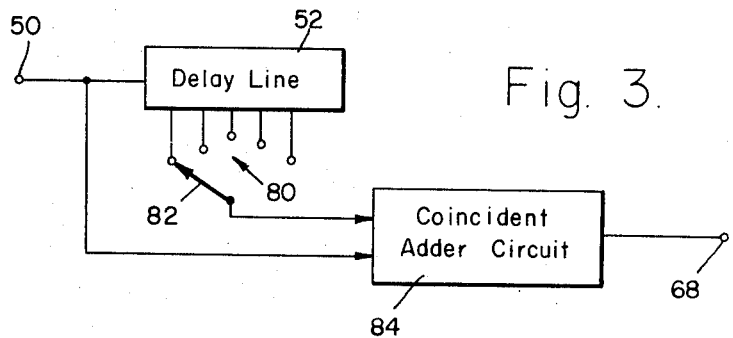
FIG. 3 is a schematic drawing of a further embodiment of the noise gate of the embodiment shown in FIG. 1.

The noise gate 13, illustrated in FIG. 1 is shown by two different embodiments in FIGS. 2 and 3. Referring first to the embodiment shown in FIG. 2, an input terminal 50 is coupled to the search unit 14 which provides the return signals which are the reflections received from the search unit 14.

Coupled to the terminal 50 is a delay line 52, which may be the type which is well known to those skilled in the art, and which delays the signal for a predetermined time $a$. This delay is shown best in FIG. 4, whereby the initial receive signal 56 is delayed the time $a$ to the signal shown 58. A coincident electron discharge type tube 60 is coupled in a manner well known to those skilled in the art to form a coincident circuit. This tube may, for example, be the 6A5G type. The output of the delay line 52 may be coupled into one of the grid electrodes of the electrodes 62 of the tube 60 and the video end terminal 50 may also be coupled into the coincident grid 64. The output signal is taken from the output terminal 68 which is coupled to the cathode electrode 66 of the tube 60 through a capacitor 70, which forms the coincident circuit. The terminal 68 is then coupled directly into the receiver 24.

Figure 4:
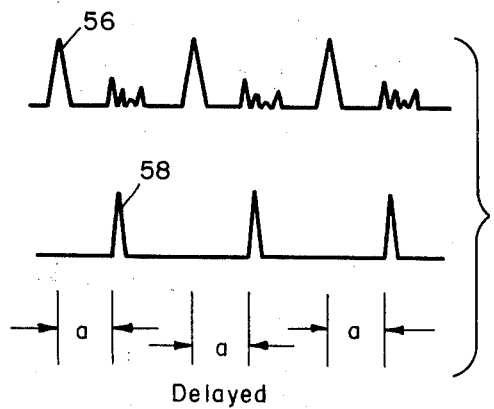
FIG. 4 is a graph illustrating the signals as they appear entering and leaving the noise gate shown in FIGS. 2 and 3.

Because the noise signals are characteristically a fast pulse of short time duration, and particularly of a shorter time duration than the return input pulse width, when return signals are applied to the terminal 50 the first part of the pulse is lost by the amount of delay time as shown in FIG. 4 and the coincident amplifier conducts until all the delay signal runs out of time as provided by the delay line 52, and stops conduction. Thus all that is lost, then, is a portion of the width of the return signal and most of the undesirable noise signals.

Referring now to FIG. 3, there is shown yet another embodiment of this invention whereby the delay line 52 may be, for example, a tap delay line including a plurality of output taps 80. A switch 82 is coupled to coincident adder circuit 84 and may be set to any of the delay line taps 80 to change the time relation of the delay line to vary the delay signal according to the amount of noise and the pulse width that is involved therewith. The coincident adder circuit 84 may be of the type shown in FIG. 2 or may, for example, be a diode AND gate or a transistor circuit, any of which are well known to those skilled in the art.

Having thus described but one preferred embodiment of this invention, what is claimed is:

1. An ultrasonic nondestructive testing system for inspecting a workpiece, said system including
    means for being acoustically coupled to the workpiece for transmitting ultrasonic energy into said workpiece and receiving echoes of the ultrasonic energy reflected from the workpiece to produce echo signals corresponding to the echoes,
    a receiver for receiving the echo signals,
    a first path coupling said means to the receiver,
    a second path parallel to the first path and coupling said means to the receiver, and
    delay means in one of said paths for delaying the echo signal in said path to said receiver, said time delay being shorter than the duration of the echo signal whereby signals having a duration less than the delay are delayed in reaching the receiver.

2. AN ultrasonic nondestructive testing system for inspecting a workpiece, said system including
    a search unit for being acoustically to the workpiece to for transmitting ultrasonic energy into said workpiece and receiving echoes of the ultrasonic energy reflected from the workpiece to thereby produce echo signals corresponding to the echoes,
    a receiver for receiving the echo signals,
    coincident gate means coupled to said receiver and having a pair of inputs, said gate being effective to prevent an echo signal present on the first input reaching the receiver when a signal is present on the second input,
    an electrical circuit coupling said search unit to the second input, and
    delay means coupling the search unit to first input, said delay means having a time delay shorter than the duration of said echo signal whereby any signals having a duration shorter than the delay are prevented from reaching the receiver.

3. An ultrasonic nondestructive testing system for inspecting a workpiece, said system including
    a pulse generator for producing a series of repetitively occurring transmitting pulses,
    a search unit connected to the pulse generator and adapted to be acoustically coupled to the workpiece for transmitting ultrasonic energy into said workpiece in response to said transmitting pulses,
    said search unit being effective to receive echoes of the ultrasonic energy reflected from the workpiece and produce echo signals corresponding thereto,
    a gate having a pair of inputs and an output,
    a first path coupling the search unit to one input on said gate,
    a second path coupling the search unit to one input on said gate,
    a second path coupling the search unit to the other input on said gate,
    delay means in one of said paths for delaying the signal therein, said delay being shorter than the duration of the echo signal whereby signals having a duration less than the delay are blocked by the gate, a receiver coupled to the output of said gate for receiving the portion of the echo signal passed by the gate, and display means coupled to the receiver for displaying the portion of the echo signal from the receiver.

4. An ultrasonic nondestructive testing system for inspecting a workpiece, said system including a pulse generator for producing a series of repetitively occurring transmitting pulses, a search unit coupled to the transmitter and adapted to be acoustically coupled to the workpiece for transmitting ultrasonic energy into said workpiece in response to said transmitting pulse, said search unit being effective to receive echoes of the ultrasonic energy reflected from the workpiece and produce echo signals corresponding thereto, a noise filter having a pair of parallel electrical paths coupled to the search unit and a coincident gate coupled to the said parallel paths, one of said paths having a time delay shorter than the duration of the echo signal whereby signals having a duration less than the delay are blocked by the coincident gate, and a receiver coupled to said gate for receiving the portion of the echo signals passed by the gate.

* * * * *